United States Patent
Shah et al.

(10) Patent No.: US 8,333,013 B2
(45) Date of Patent: Dec. 18, 2012

(54) CONTINUOUS MANUFACTURING PROCESS FOR METAL-PLASTIC HYBRID HEAT EXCHANGER

(75) Inventors: Suresh D. Shah, Troy, MI (US); Mohinder S. Bhatti, Williamsville, NY (US); Karl P. Roetsch, Williamsville, NY (US)

(73) Assignee: Delphi Technologies, Inc, Troy, MI (US)

( * ) Notice: Subject to any disclaimer, the term of this patent is extended or adjusted under 35 U.S.C. 154(b) by 1068 days.

(21) Appl. No.: 12/287,216

(22) Filed: Oct. 7, 2008

(65) Prior Publication Data

US 2010/0083501 A1    Apr. 8, 2010

(51) Int. Cl.
*B23P 15/26* (2006.01)

(52) U.S. Cl. ............................. 29/890.045; 29/890.03

(58) Field of Classification Search . 29/890.03–890.054
See application file for complete search history.

(56) References Cited

U.S. PATENT DOCUMENTS

| | | | |
|---|---|---|---|
| 3,648,768 A * | 3/1972 | Scholl | 165/171 |
| 3,668,757 A | 6/1972 | Rieder | |
| 3,712,372 A * | 1/1973 | Tranel | 165/170 |
| 3,962,766 A * | 6/1976 | Pompidor et al. | 29/890.047 |
| 4,297,775 A * | 11/1981 | Butt et al. | 29/890.039 |
| 4,688,311 A * | 8/1987 | Saperstein et al. | 29/890.053 |
| 4,926,933 A | 5/1990 | Gray | |
| 4,942,654 A * | 7/1990 | Wright et al. | 29/890.035 |
| 5,469,915 A * | 11/1995 | Cesaroni | 165/171 |
| 6,554,929 B2 | 4/2003 | Lee | |
| 6,793,012 B2 | 9/2004 | Fang et al. | |
| 6,899,168 B2 | 5/2005 | Ghiani | |
| 7,044,211 B2 | 5/2006 | Insalaco | |
| 7,089,998 B2 | 8/2006 | Crook | |
| 7,234,511 B1 | 6/2007 | Lesage | |

FOREIGN PATENT DOCUMENTS

EP   0339552 B1   7/1993

* cited by examiner

*Primary Examiner* — Richard Chang
(74) *Attorney, Agent, or Firm* — James M. Chan

(57) ABSTRACT

The invention is a method for producing a heat exchanger assembly including the steps of extruding a plastic and an adhesive from a co-extrusion die into a plurality of tubes spaced from each other with each tube having an adhesive disposed on its exterior surface. A plurality of corrugated air fins are serially fed into the co-extrusion die and spaced from each other by a predetermined space and ejected between adjacent tubes with the corrugations extending transversely between the tubes. The adhesive is then cured to secure the tubes to the air fins. The method proceeds by cutting the tubes at each predetermined space with a guillotine shear to produce a plurality of unified heat exchanger cores. The ends of the tubes of each core are inserted into tube slots in manifolds, and the tubes and manifolds are adhesively secured together to define a heat exchanger assembly.

18 Claims, 3 Drawing Sheets

CONTINUOUS MANUFACTURING PROCESS FOR METAL-PLASTIC HYBRID HEAT EXCHANGER

BACKGROUND OF THE INVENTION

1. Field of the Invention

The invention relates to a method of manufacturing a heat exchanger assembly.

2. Description of the Prior Art

Heat exchanger assemblies are employed as condensers and evaporators for use in air conditioning systems, radiators, heater cores, etc. One type of heat exchanger construction comprises a number of tubes extending in spaced and parallel relationship that are joined to and extend between a pair of manifolds. Air fins are also disposed between adjacent parallel tubes to transfer heat from the tubes to the air or vice-versa. Typically, the manifolds, tubes, and air fins are all made of metals having a high thermal conductivity materials, e.g. aluminum.

Recent advances in thermoplastic technology have led to the development of heat exchangers having plastic tubes and manifolds that can be adhesively joined. The new thermoplastics have an increased thermal conductivity relative to that of the traditional plastics. One example of a heat exchanger assembly employing plastic tubes with external helical fins of plastic is shown in U.S. Pat. No. 4,926,933, issued to James Gray on May 22, 1990. The '933 patent also discloses a batch (as opposed to a continuous) process of manufacturing a heat exchanger including the steps of extruding or injection molding a plurality of plastic tubes with external helical fins of plastic. The '933 patent does not delve into the use of high thermal conductivity convoluted louvered fins of metal or the method of bonding the same to the plastic tubes to form a metal-plastic hybrid heat exchanger.

SUMMARY OF THE INVENTION

The invention provides for such a method wherein the die is a co-extrusion die and the step of inserting the air fin is further defined as feeding at least one air fin into the co-extrusion die and ejecting each air fin from the co-extrusion die between adjacent tubes.

The method increases the efficiency of manufacturing the heat exchangers and lowers the cost of manufacturing. It allows for the use of thermoplastic tubes in combination with metal fins without having to add an additional step to the manufacturing process. In many uses, a coolant, which acts as a corrosion catalyst, flows through the tubes of the heat exchanger, and therefore, plastic tubes are desirable because they will not corrode. Additionally, thermoplastic tubes also are generally cheaper than metal tubes. Metal fins are more efficient than plastic fins because metal generally has a higher thermal conductivity than thermoplastics. Moreover, metal fins provide reinforcement to the relatively low strength plastic tubes, thereby increasing the tube stiffness and the ability of the tubes to withstand high internal pressure from the coolant in the tubes. Corrosion of the fins is generally not a concern because they are rarely subjected to coolants and other salts that would perpetuate the onslaught of corrosion. In summary, the net result of the method of the invention is a durable, low-cost, and highly efficient hybrid (metal and thermoplastic) heat exchanger assembly comprising metal fins and plastic tubes.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE EXEMPLARY EMBODIMENT

Figure 1:
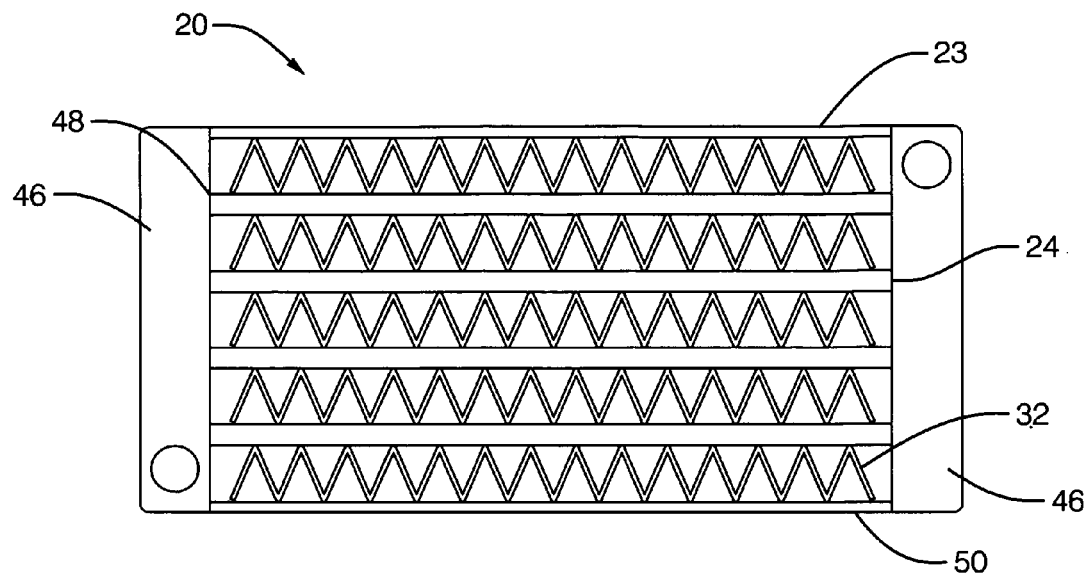
FIG. 1 is a view of the hybrid heat exchanger complete with plastic tubes, metal fins and plastic manifolds.
Figure 3:
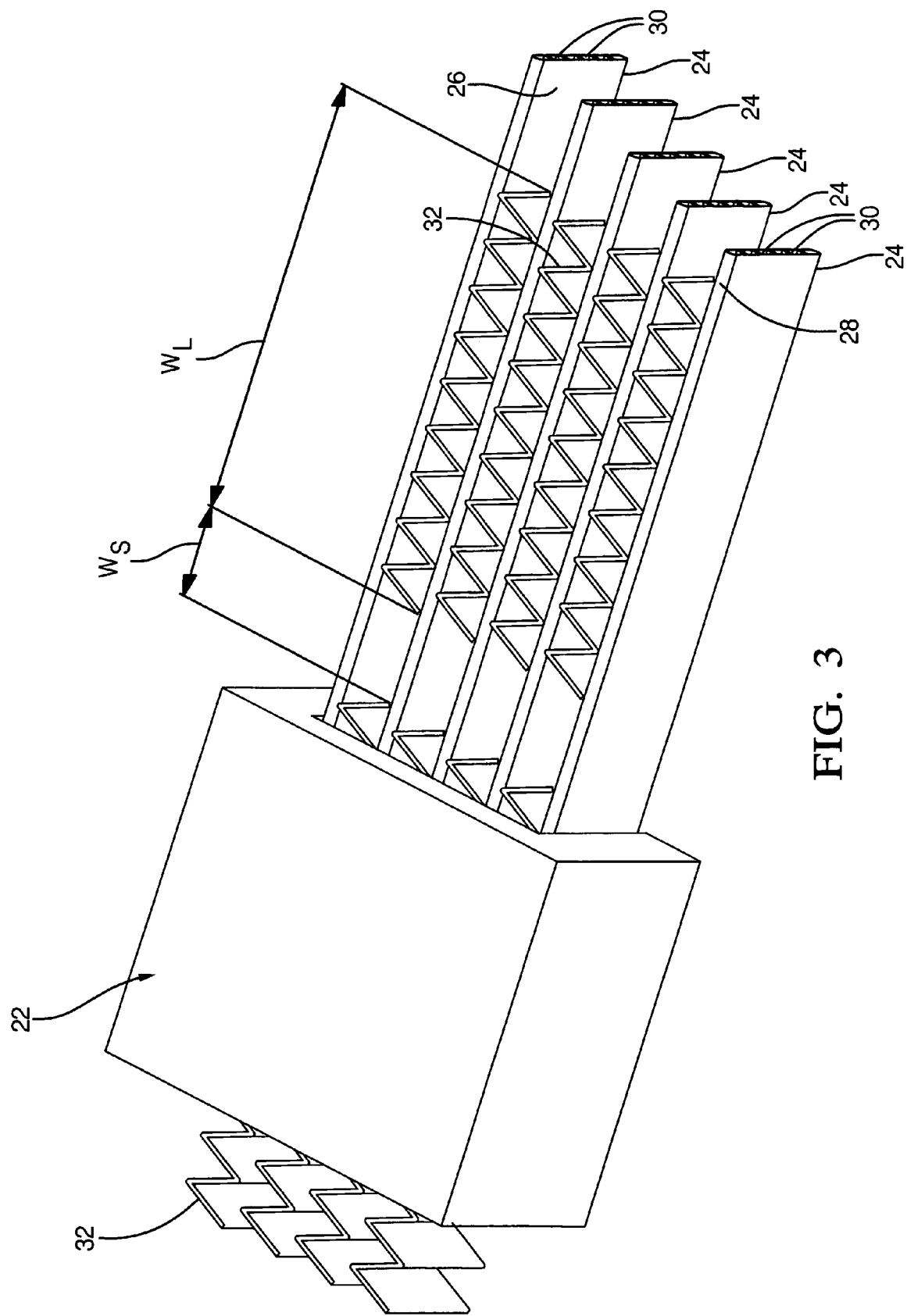
FIG. 3 is a perspective and fragmentary view of the tubes being extruded from the die and the air fins being ejected from the die between adjacent tubes.

Referring to the Figures, wherein like numerals indicate corresponding parts throughout the several views, the invention is a method for producing a hybrid heat exchanger assembly 20, shown generally in FIG. 1 The method starts (see FIG. 3) with the step of extruding a plastic from the co-extrusion die 22 into a pair of reinforcement plates 23 together with a plurality of tubes 24 spaced from each other and each having a cross-section defining an exterior surface presenting flat sides 26 and round ends 28. In one embodiment, the tubes 24 define an interior surface including a plurality of webs 30 spaced from each other and extending transversely between the flat sides 26. However, the tubes 24 could also define a plurality of micro-channels or have any other interior surface capable of conveying a fluid.

Figure 4:
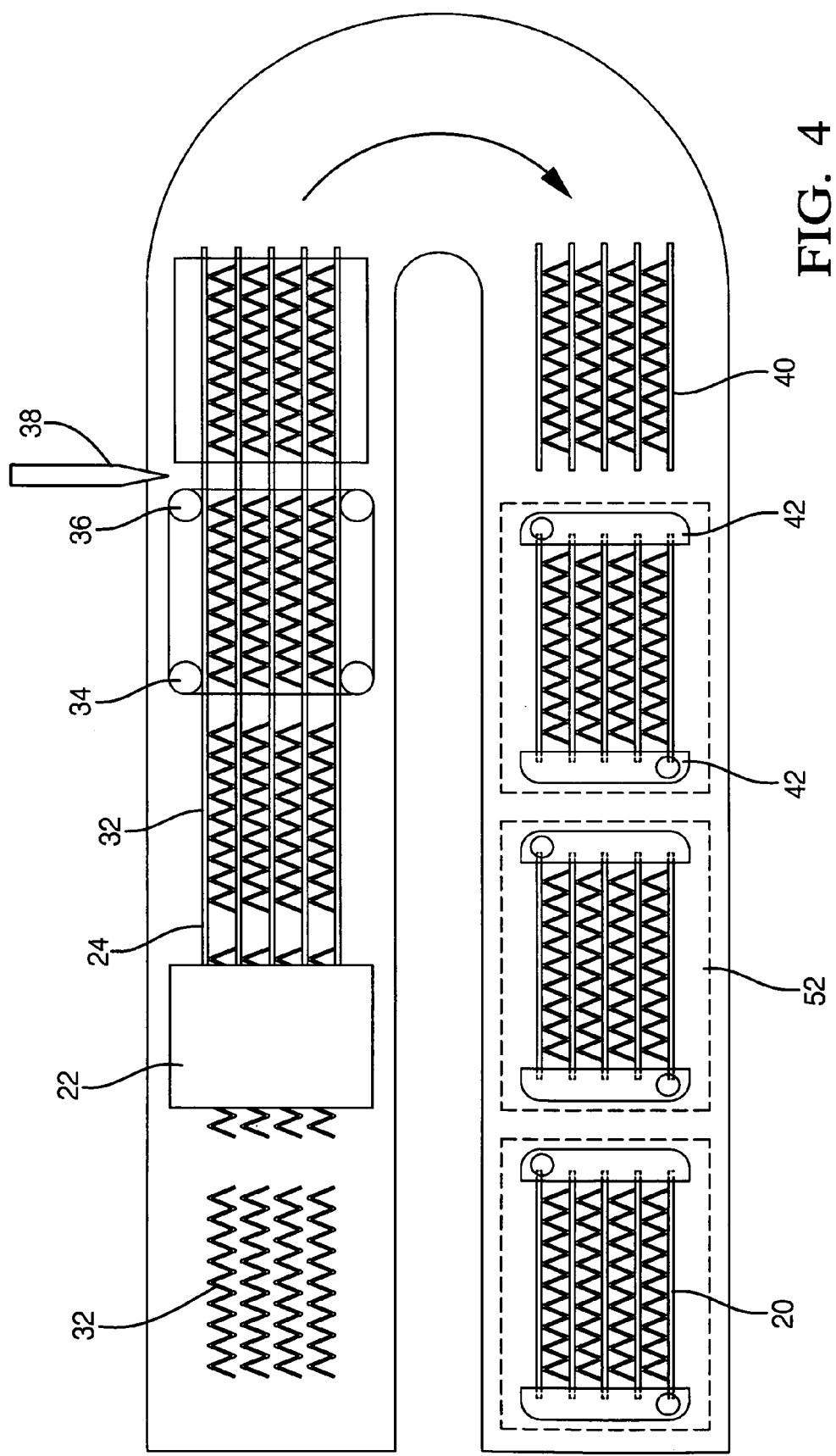
FIG. 4 is a view of the steps of the method for manufacturing the heat exchanger assembly.

The method, shown in FIG. 4, continues with the step of extruding the adhesive from the co-extrusion die 22 onto the exterior surface of the plastic tube 24 and inserting an air fin 32 between the flat sides 26 of adjacent tubes 24 with the air fin 32 being corrugated and of metal and having a predetermined length $W_L$. The inserting the air fin 32 is further defined as serially feeding into the co-extrusion die 22 a plurality of the air fins 32 in end to end relationship and spacing the air fins 32 to define a predetermined space $W_S$ between adjacent air fins 32. Each air fin 32 of predetermined length $W_L$ is then ejected from the co-extrusion die 22 between the flat sides 26 of adjacent tubes 24 with the corrugations engaging the flat sides 26 of adjacent tubes 24 and extending transversely therebetween.

The method proceeds with the step of pressing the tubes 24 and the air fins 32 together with a nip roll 34 to establish contact between the crests of the corrugated air fins 32 and the adhesive disposed on the flat sides 26 of the exterior surface of the tubes 24. The adhesive is then cured to secure the tubes 24 to the corrugated air fins 32. The tubes 24 and corrugated air fins 32 are then fed from the nip roll 34 to a cutting station by engaging the tubes 24 with take-off rolls 36.

The method continues with the step of cutting the tubes 24 at each predetermined space $W_S$ between air fins 32 with a guillotine shear 38 to produce a plurality of a unified heat exchanger cores 40. Each of the cores 40 presents a plurality of alternating tubes 24 and corrugated air fins 32 when viewed in cross-section and the opposite ends of the tubes 24 extend outward of the corrugated air fins 32.

Figure 2:
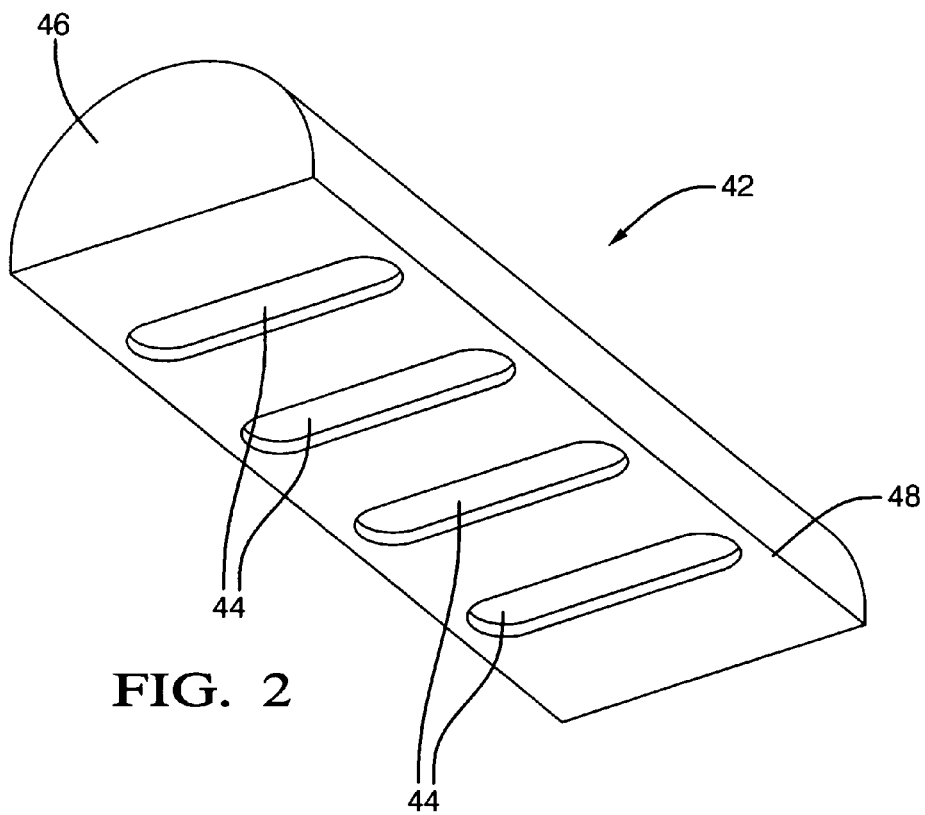
FIG. 2 is a perspective view of the manifold including the tank and header.

The method then proceeds with the step of inserting protruding ends of the tubes 24 into the spaced slots 44 of a pair of preformed manifolds 42 of a plastic material. The manifolds 42 may be fabricated as a single-piece assembly by an injection molding process; however, any other process for preparing the manifolds 42 may also be used, including but not limited to machining, extrusion, casting, etc. The single piece manifold 42 of the exemplary embodiment, generally shown in FIG. 2, comprises two main parts—a tank 46 and a slotted header 48 with a plurality of tube slots 44 spaced to correspond with the spacing of the tubes 24 in the heat exchanger core 40. One end of the tubes 24 of each core 40 is inserted into the tube slots 44 of one of the manifolds 42 and the other end of the tubes 24 of each core 40 is inserted into the tube slots 44 of another manifold 42.

Finally, the method is completed with the step of securing the tubes 24 of each heat exchanger core 40 to the tube slots 44 of the associated manifolds 42 to establish sealed fluid communication between the manifolds 42 and the tubes 24 of each core 40. As aforesaid, the adhesive layer is applied to the outer surface of the tubes 24 during the extrusion process. The adhesive material is selected to bond the metal fins 32 to the flat sides 26 of the plastic tubes 24 and also to bond the plastic tubes 24 to the tube slots 44. The final step of securing the metal fins 32 and the tube slots 44 to the plastic tubes 24 is accomplished in a low temperature—of the order of 400° F.—curing oven 52 at end of the line. One example of such a curing oven 52 is an infrared radiation oven. From the curing oven 52 emerges the fully formed heat exchanger.

A distinguishing feature of the metal-plastic hybrid heat exchanger 20 is that it employs metal fins 32 in conjunction with plastic tubes 24 on the air side in order to reduce thermal resistance on air side of the heat exchanger 20. The choice of metal fins 32 on the air side is advantageous because plastic air fins 32 are ineffective in reducing the thermal resistance of the air side. The explanation of the ineffectiveness of the plastic air fins 32 to reduce the air side thermal resistance can be provided in terms of the dimensionless fin temperature effectiveness $\eta_f$, which is a measure of how effectively an air fin 32 conducts heat compared to the isothermal prime surface, i.e., the surface in direct contact with the heat source whence the heat is to be dissipated. The dimensionless fin temperature effectiveness $\eta_f$ for a thin sheet air fin 32 is expressible in terms of a dimensionless fin parameter $(2h/\kappa_f \delta_f)^{1/2} l$ as $$\eta_f = \frac{\tanh(2h/\kappa_f \delta_f)^{1/2} l}{(2h/\kappa_f \delta_f)^{1/2} l} \quad (1)$$

where h is the heat transfer coefficient of the fluid surrounding the air fin, $\kappa_f$ is the thermal conductivity of the fin material, $\delta_f$ is $\delta_f$ the fin thickness and l is the fin length along which heat is conducted. When the air fin 32 extends from between adjacent tubes 24 as in the subject invention, the effective fin length l is half the distance between the tubes 24.

By way of a concrete example, let us calculate the fin temperature effectiveness $\eta_f$ for a convoluted louvered air fin 32 used in automotive heat exchangers such radiators, heaters, condenser and evaporators. Let the air fin 32 be made of three different types of materials—conventional plastic with $\kappa_f=0.25$ Wm$^{-1}$K$^{-1}$, thermally conductive plastic with $\kappa_f=25$ Wm$^{-1}$K$^{-1}$ and metal with $\kappa_f=250$ Wm$^{-1}$K$^{-1}$. The typical value of the convective heat transfer coefficient h in the automotive heat exchangers with air as the cooling medium is 60 Wm-$^1$K$^{-1}$. Also the typical values of the fin thickness $\delta_f$ and the fin length l are 0.0762 mm and 10 mm respectively.

Using the foregoing numerical values, we obtain $(2h/\kappa_f \delta_f)^{1/2} l=25.0982, 2.5098, 0.7937$ corresponding to $\kappa_f=0.25, 25, 250$ Wm-$^1$K$^{-1}$. Introducing these values of into Equation (1), we obtain $\eta_f=0.0398, 0.3932, 0.8322$ corresponding to $\kappa_f=0.25, 25, 250$ Wm-$^1$K$^{-1}$. These results show that the fin effectiveness 0.0398 of the conventional plastics is extremely poor. For the thermally conductive air fins 32, the fin effectiveness 0.3932 is considerably improved, but it is still significantly lower than the fin effectiveness 0.8322 of the metal air fins 32. Therefore, the use of metal air fins 32, in the hybrid heat exchanger assembly 20 is significantly more effective than the use of plastic air fins 32.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for producing a heat exchanger assembly comprising the steps of:
    extruding a plastic from a co-extrusion die into a plurality of tubes spaced from each other;
    extruding the adhesive onto an exterior surface of the plastic tube;
    inserting an air fin between adjacent tubes; and
    characterized by the inserting the air fin being further defined as feeding at least one air fin into the co-extrusion die and ejecting each air fin from the co-extrusion die between adjacent tubes.

2. The method as set forth in claim 1 wherein the air fin is of metal.

3. The method as set forth in claim 1 wherein the feeding at least one air fin is further defined as serially feeding a plurality of air fins in end to end relationship and spacing the air fins to define a predetermined space between adjacent air fins.

4. The method as set forth in claim 3 wherein the extruding the plastic into a plurality of tubes is further defined as extruding the tubes to each have a cross-section defining an exterior surface presenting flat sides and round ends.

5. The method as set forth in claim 4 wherein the inserting the air fin is further defined as inserting an air fin being corrugated between the flat sides of adjacent tubes.

6. The method as set forth in claim 5 wherein the ejecting each air fin is further defined as ejecting each air fin from the co-extrusion die between the flat sides of adjacent tubes with the corrugations engaging the flat sides of the tubes and transverse to the flat sides simultaneously with the extruding the plastic into a plurality of tubes.

7. The method as set forth in claim 3 further including the step of feeding the tubes and air fins to a cutting station by engaging the tubes with take-off rolls.

8. The method as set forth in claim 3 further including the step of cutting the tubes along each predetermined space between the air fins to produce a plurality of unified heat exchanger cores each presenting a plurality of alternating tubes and air fins when viewed in cross-section and with opposite ends of the tubes extending outward of the air fins.

9. The method as set forth in claim 8 wherein the cutting the tubes is further defined as cutting the tubes with a guillotine shear.

10. The method as set forth in claim 8 further including the step of forming a plurality of manifolds presenting a plurality of tube slots spaced from each other to correspond with the spacing of the tubes in the heat exchanger.

11. The method as set forth in claim 10 further including the step of inserting one end of the tubes of each core in the tube slots of one of the manifolds and inserting the other end of the tubes of each core into the tube slots of another manifold.

12. The method as set forth in claim 11 further including the step of securing the tubes of each heat exchanger core in the tube slots of the associated manifolds to establish sealed fluid communication between the manifolds and the tubes of each core.

13. The method as set forth in claim 12 where the securing the tubes to the tube slots is further defined as adhesively securing the tubes in the tube slots.

14. The method as set forth in claim 1 further including the step of pressing the tubes and air fins together to establish contact between the air fins and the adhesive disposed on the exterior surface of the tubes.

15. The method as set forth in claim 14 wherein the pressing the air fins together is further defined as pressing the fins together with a nip roll.

16. The method as set forth in claim 14 further including the step of curing the adhesive to secure the tubes to the air fins.

17. The method as set forth in claim 1 wherein the extruding the plastic into a plurality of tubes is further defined as extruding the tubes to each have a cross-section defining an exterior surface presenting flat sides and round ends.

18. A method for producing a heat exchanger comprising the steps of:
- extruding a plastic from a co-extrusion die into a plurality of tubes spaced from each other and each of the tubes having a cross-section defining an exterior surface presenting flat sides and round ends and an interior surface including a plurality of webs spaced from each other and extending transversely between the flat sides;
- extruding an adhesive from the co-extrusion die onto the exterior surface of the plastic tube;
- inserting an air fin between the flat sides of adjacent tubes with the air fin being corrugated and of metal and having a predetermined length; and
- characterized by inserting the air fin being further defined as serially feeding into the co-extrusion die a plurality of the air fins in end to end relationship and spacing the air fins to define a predetermined space between adjacent air fins and ejecting each of the air fins of a predetermined length from the co-extrusion die between the flat sides of the adjacent tubes with the corrugations engaging the flat sides of the tubes and transverse to the flat sides simultaneously with the extruding the plastic into the plurality of tubes;
- pressing the tubes and the metal fins together with a nip roll to establish contact between the corrugated air fins and the adhesive disposed on the flat sides of the exterior surface of the tubes;
- curing the adhesive to secure the tubes to the corrugated fins;
- feeding the tubes and corrugated fins to a cutting station by engaging the tubes with take-off rolls;
- cutting the tubes along each of the predetermined space between the air fins with a guillotine shear to produce a plurality of a unified heat exchanger cores, each of the cores presenting a plurality of alternating tubes and the corrugated air fins when viewed in cross section and with opposite ends of the tubes extending outward of the corrugated air fins;
- forming a plurality of manifolds of a plastic material including a plurality of tube slots spaced from each other to correspond with spacings of the tubes in the heat exchanger core;
- inserting one end of the tubes of each of the cores into the tube slots of one of the manifolds and inserting the end of the tubes of each of the cores into the tube slots of another manifold; and
- adhesively securing the tubes of each heat exchanger core in the tube slots of the associated manifolds to establish sealed fluid communication between the manifolds and the tubes of each of the cores.

\* \* \* \* \*